(12) United States Patent
He

(10) Patent No.: US 6,678,588 B2
(45) Date of Patent: Jan. 13, 2004

(54) TERRAIN AUGMENTED 3D FLIGHT PATH DISPLAY FOR FLIGHT MANAGEMENT SYSTEMS

(75) Inventor: Gang He, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/122,046

(22) Filed: Apr. 12, 2002

(65) Prior Publication Data

US 2003/0195672 A1 Oct. 16, 2003

(51) Int. Cl.[7] ................................................. G05D 1/00
(52) U.S. Cl. ............................................................ 701/3
(58) Field of Search ................................. 701/1, 3, 4, 8, 701/9, 14, 300, 301

(56) References Cited

U.S. PATENT DOCUMENTS 6,021,374 A    2/2000   Wood
6,112,141 A    8/2000   Briffe
6,317,690 B1 * 11/2001  Gia ............................. 701/301

FOREIGN PATENT DOCUMENTS

EP    1087210 A    3/2001

* cited by examiner

Primary Examiner—Yonel Beaulieu

(57) ABSTRACT

The computation and data load for producing a flight plan and terrain display for a flight management system is reduced through the use of intelligent level of detail control which computes and displays flight plan areas and related terrain with a high level of detail. The outer terrain details, i.e., those further removed from the flight path, are processed and displayed in a manner that shows all significant terrain features, e.g., peaks, towers, and the like, but with much less detail so as to significantly reduce the overall computational load for producing such 3D flight path displays in real time. This ensures that all-important information relative to the flight path is correctly processed and displayed while secondary information is shown with important features to provide broad awareness of areas surrounding the intended flight path.

12 Claims, 5 Drawing Sheets

TERRAIN AUGMENTED 3D FLIGHT PATH DISPLAY FOR FLIGHT MANAGEMENT SYSTEMS

TECHNICAL FIELD

The present invention relates to a display for a vehicle, and more particularly to a display for an aircraft flight management system which also displays terrain features.

BACKGROUND OF THE INVENTION

Modern map displays, particularly those used in aircraft for flight planning and monitoring, are capable of displaying a considerable amount of information such as flight planning information and terrain information. The terrain information consists of situational awareness (SA) terrain and terrain cautions and warnings which, among other things, may indicate where the aircraft may potentially impact terrain. The flight planning information consists of flight path information, altitude information and other information useful to a pilot or crewmember in following and anticipating the path and altitude of the aircraft over the ground.

A three dimensional representation of a flight path provides better spatial understanding of the planned flight path and therefore reduces the navigational workload for a flight crew. In particular, when a 3D terrain representation is used as an underlay for a 3D flight path display, the relative positioning of the flight path to the terrain can readily be seen. This aids in detecting potential flight path conflicts with terrain as well as planning for optimal paths around potentially hazardous areas. The 3D flight path display with a terrain underlay will also significantly enhance the perception of depth and relative location during the flight path visualization therefore reducing flight crew work load and providing more timely information about potential dangers along the flight path. There are significant challenges to producing such displays since such displays often must cover a large area of terrain. Generating the displays in real time with a large amount of terrain data presents significant difficulties for avionics flight management and display systems including the difficulty of performing the enormous computational tasks associated with providing detailed terrain representations over a large area.

BRIEF SUMMARY OF THE INVENTION

The instant invention addresses the aforementioned difficulties by significantly reducing the computation and data load for producing the flight plan and terrain display for flight management systems. This is accomplished through the use of intelligent level of detail control which computes and displays flight plan areas and related terrain with a high level of detail. The outer terrain details, i.e., those further removed from the flight path are processed and displayed in a manner that shows all significant terrain features, e.g., peaks, towers, and the like, but with much less detail so as to significantly reduce the overall computational load for producing such 3D flight path displays. This ensures that all-important information relative to the flight path is correctly processed and displayed while secondary information is shown with important features to provide broad awareness of areas surrounding the intended flight path.

BRIEF DESCRIPTION OF THE DRAWINGS

The present invention will hereinafter be described in conjunction with the appended drawing figures, wherein like numerals denote like elements, and in which.

DETAILED DESCRIPTION OF A PREFERRED EMBODIMENT

Figure 1:
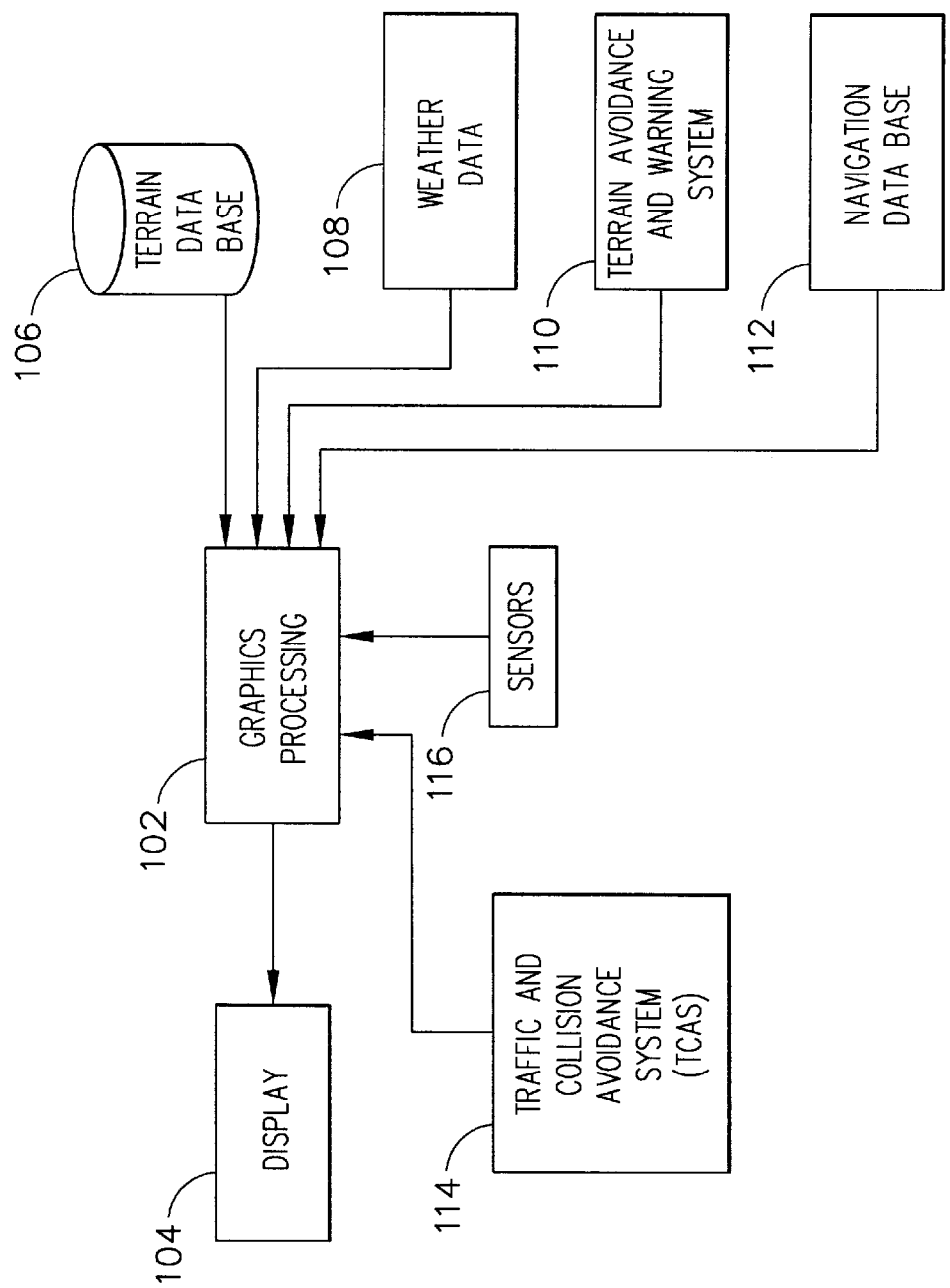
FIG. 1 is a block diagram of a flight management display system usable with the instant invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be appreciated that the particular implementations shown and described herein are illustrative of the invention and its best mode and are not intended to otherwise limit the scope of the invention in any way.

In FIG. 1, an exemplary flight management display system 100 includes a graphics processor 102 configured to provide information to a display element or monitor 104. One or more data sources are coupled to the processor 102. These data sources may be, but are not limited to, a terrain data base 106, weather radar data source 108 from an on-board weather radar unit or from an external weather data source such as a ground-based weather data source or a satellite weather data source, a terrain avoidance and warning system (TAWS) 110, a navigation data base 112, a traffic and collision avoidance system (TCAS) 114 or other sensors 116 which may provide additional useful information to a user.

A number of aspects of display element 104 (which are controlled by processor 102 in a practical embodiment) may contribute to the improved contents and appearance of the display, thus increasing the situational and terrain awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at processor 102.

Processor 102 encompasses one more functional blocks used to provide a flight management, navigational, weather, terrain, and positional interface with the pilot, and input to display element 104. Processor 102 may include or cooperate with a mode, position and/or detection element that is capable of determining the mode or position of the vehicle relative to one or more reference locations, points, planes, or navigation aids. In addition, processor 102 may be configured to receive, analyze, condition, and process navigation and positional information, including flight path information as well as weather information associated with the vehicle. In this regard, processor 102 may include any number of individual microprocessors, flight computers, navigation equipment, memories, storage devices, interface cards, and other standard components known in the art. Moreover, processor 102 may include any number of microprocessor elements, memory elements, power supplies, and other functional components as necessary to support the operation of the display system 100. In this respect, processor 102 may include or cooperate with any number of software programs or instructions designed to carry out various methods, process tasks, calculations, control functions, and the generation of display signals and other data used by display element or monitor 104. For example, processor 102 may be configured to generate an annunciator associated with the position of the aircraft relative to at least one reference location, to generate windows corresponding to user inputs, to combine inputs from various sensors to create a data stream for presentation to the display element 104, and the like.

Processor 102 may also be suitable configured to receive and process navigational data 112 related to an intended flight path and destination of the aircraft. In a practical commercial aircraft application, such navigational data 112 may be associated with specific waypoints, airports, navigational aids, or the like. As described in more detail below, processor 102 may process data from any of the data inputs shown above and generate appropriate signals to display element 104 such that display element 104 generates indicia representative of the appropriate navigational, weather, terrain, or other information, or the like. Such processors and flight control computers are available from a number of manufacturers such as Honeywell International Inc. In an exemplary embodiment, processor 102 is incorporated within a flight management system (FMS) or another avionics component which, inter alia, formats navigation data and forwards the data to monitor 104 for display as data on display 104.

Display element 104 may include any display element suitable for displaying the various symbols and information detailed below. Many currently known monitors are suitable for this task, including various CRT and flat-panel display systems. Display element 104 may be based on a panel mounted display, a HUD projection, or any known technology. In an exemplary embodiment, display element 104 includes a panel display. Display element 104 suitably includes various graphical elements associated with the environment of the aircraft including the location of various navigational aids including VHF Omnirange stations, non-directional beacons, radio stations, and the like, and airports, airways, special use airspace, and other aircraft.

In operation, the graphics processor 102 obtains inertial or other data (position, speed, direction) from the sensors 116. Based on the inertial data, the graphics processor 102 obtains terrain data and navigation data from the data bases 106, 112. These data bases are typically onboard the aircraft, but need not be limited to such a design. The graphics processor 102 renders a picture of the absolute terrain, and the navigation data (VORs, airports, airways, etc) and flight path is also rendered on the display element 104. The TAWS 110 provides data to the graphics processor 102 regarding the location of terrain that may be a threat to the aircraft. The graphics processor 102 may show the potential threat terrain in various colors depending on the level of threat: red for warnings (immediate danger), yellow for cautions (possible danger), and green for terrain that is not a threat Of course, other colors and different numbers of levels of threat can be provided as a matter of choice.

Figure 2:
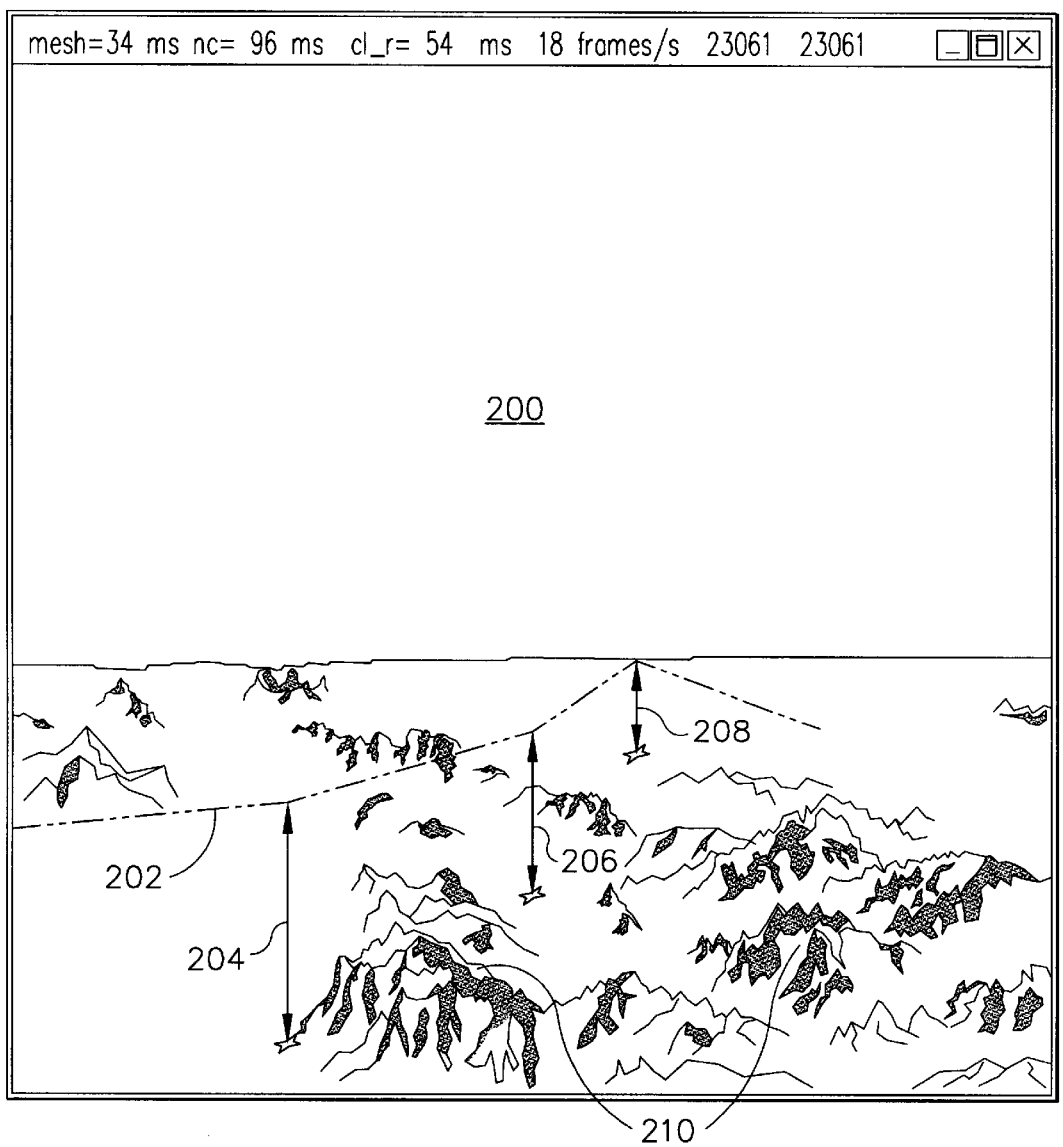
FIG. 2 is a representation of a display showing an aircraft flight path underlaid by terrain features in relatively high detail.

FIG. 2 is a representation of a display showing an aircraft flight path underlaid by terrain features in relatively high detail. The projected flight path of the aircraft in accordance with the flight plan is shown at 202 and is provided by the navigation database 112 of FIG. 1 as that data is processed by graphics processor 102. The altitude of the aircraft in accordance with the flight plan is shown at various locations in the flight path by the markers at 204, 206, and 208.

The flight path 202 is underlaid with terrain features shown generally at 210. These terrain features are provided by the terrain database 108 as that data is processed by the graphics processor 102 of FIG. 1. It can be seen that the terrain features in FIG. 2 are displayed in a relatively detailed manner. Consequently, the computational load that such a detailed terrain representation places on the graphics processor 102 is quite high.

Figure 3:
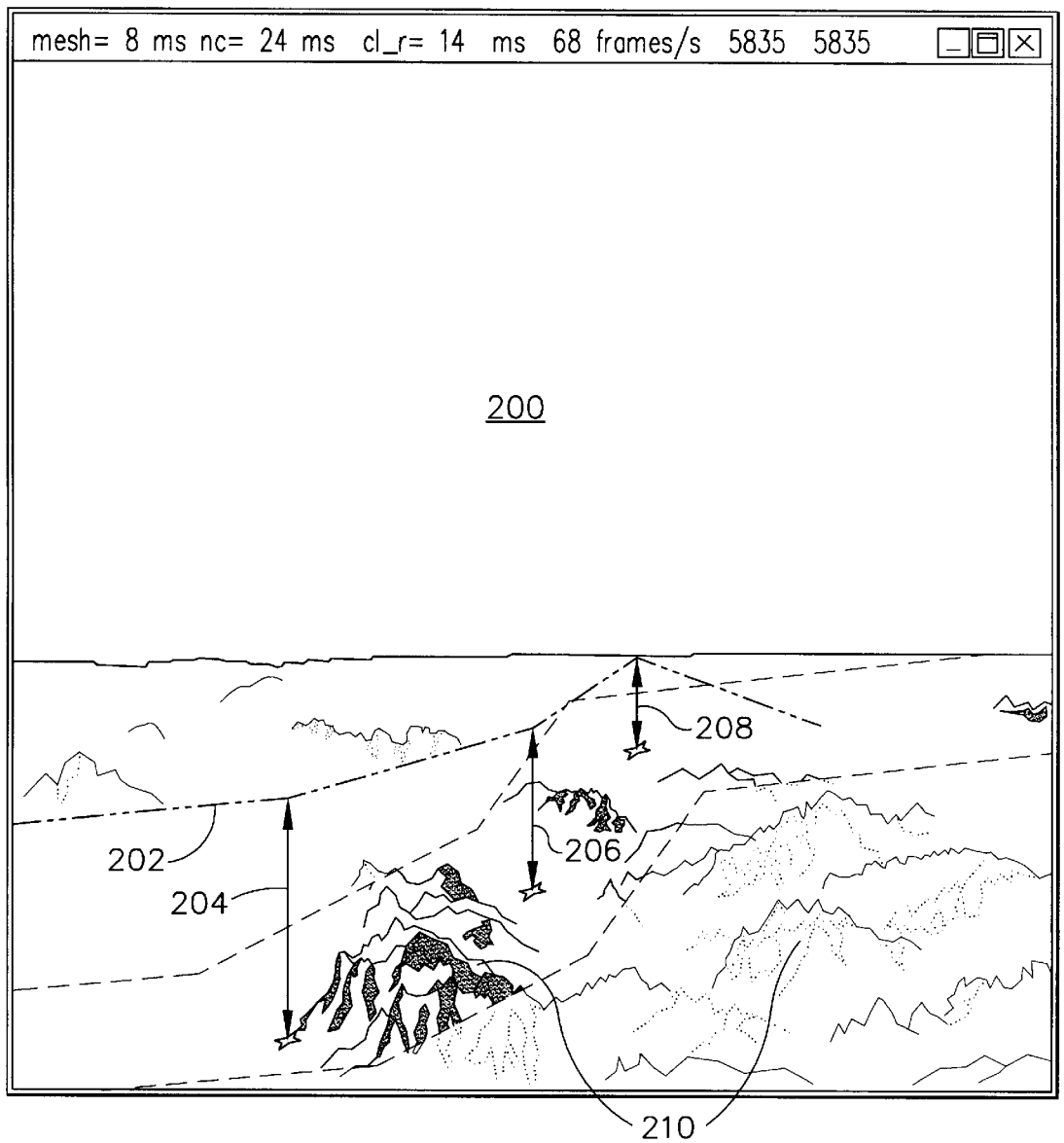
FIG. 3 is a representation of a display showing an aircraft flight path underlaid by terrain features in relatively lower detail.

FIG. 3 is a representation of a display showing an aircraft flight path underlaid by terrain features in relatively lower detail. The projected flight path of the aircraft in accordance with the flight plan is shown again at 202 (similar items in different drawings are given similar numbers) and is provided by the navigation database 112 of FIG. 1 as processed by the graphics processor 102. The altitude of the aircraft in accordance with the flight plan is shown at various locations in the flight path by the markers at 204, 206, and 208.

The flight path 202 is underlaid with terrain features shown generally at 210. It can be seen that the terrain features in FIG. 3 are displayed in a relatively less detailed manner than those of FIG. 2. There are fewer small bumps shown, but the significant terrain features and peaks remain. Consequently, the computational load that such a detailed terrain representation places on the graphics processor 102 of FIG. 1 is substantially lower than that of the terrain representation of FIG. 2.

It can also be seen that the level of detail of the terrain display remains relatively high directly under the flight path and proximate to it but becomes even lower in those portions of the display further from the flight path of the aircraft, thus contributing to the relatively lower computational load on graphics processor 102.

Figure 4:
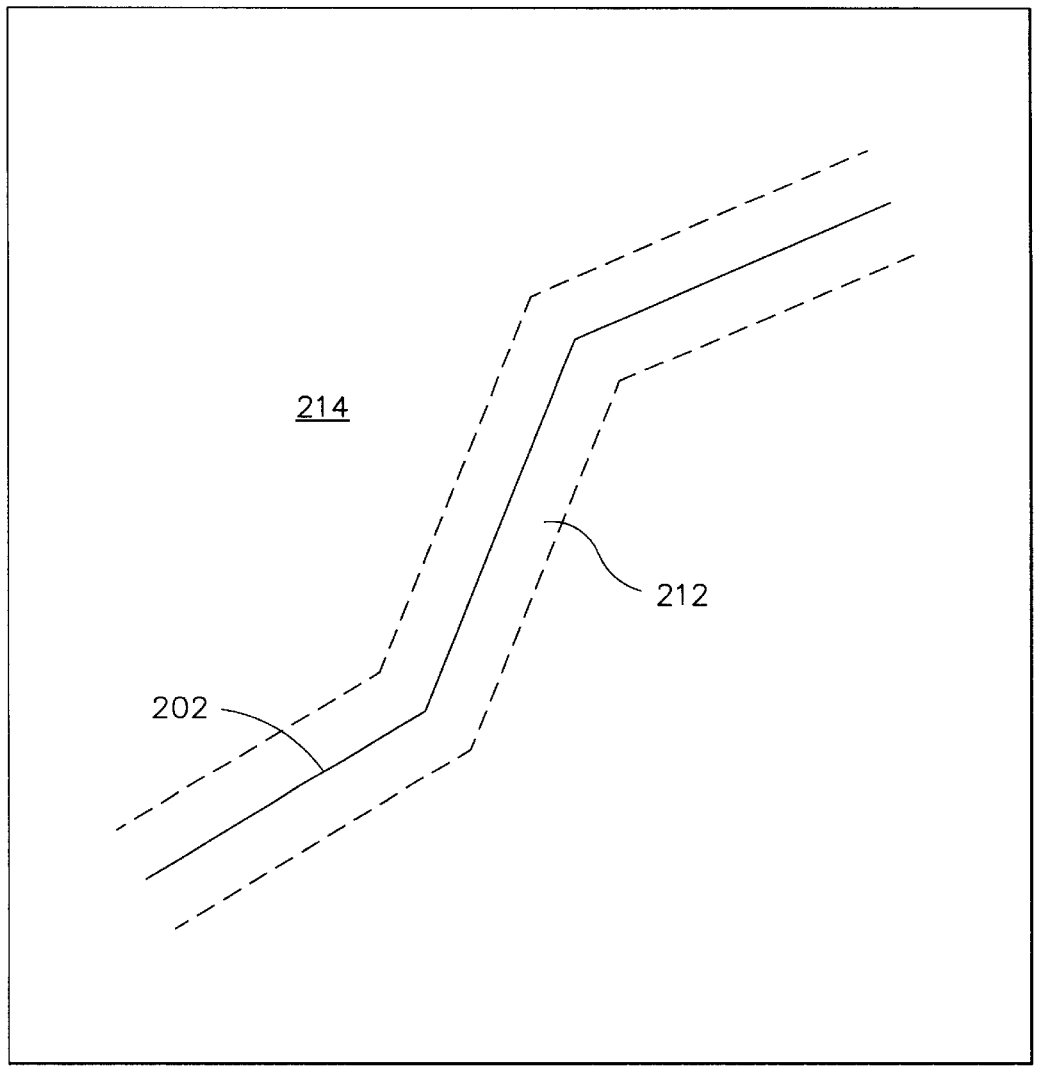
FIG. 4 is a representation of a flight path showing the area immediately proximate the path.

FIG. 4 is a representation of a flight path showing the area immediately proximate the flight path. Again, the flight path of an aircraft is shown at 202. The area 212 proximate the flight path and extending laterally from the flight path, the width of which is dictated by the severity of the terrain along the flight path and the choice of the pilot and crew, is the area within which the terrain display is at its highest resolution or level of detail. Outside the area 212, represented in FIG. 4 as 214, the resolution of the terrain may be displayed at a relatively lower level of detail since the terrain threat to the aircraft is lessened because of the distance from the aircraft to a threat. As noted above, however, even in area 214, major terrain features would be shown.

The variance in detail of the terrain is accomplished by utilizing graphing techniques which allow a display of reduced detail in certain areas as noted above, thereby reducing in those areas the processing workload of the graphics processor 102 of FIG. 1.

The terrain is depicted initially as a square patch of terrain having NxN terrain elevation data points which relate to the height at that location above sea level or some other arbitrary elevation reference point. When many of these data are specified, such as a square patch, it may be termed a terrain height field. Looking from a top-down perspective, it appears that these data points are laid out as a square. Terrain elevation data are usually given at discrete, regularly spaced points, say 100 meters apart (or some other appropriate distance, depending on the area to be covered and the detail required). In order to graphically represent the terrain, simple polygons are used to connect the data points to make them appear continuous on a graphic display. The connection of these discrete data points forms a mesh. Triangles may be used to connect the data points. These non-overlapping triangles form a triangle or polygon mesh. Alternatively, quad. Octal, or other shapes may be used to connect the data points.

The triangles (as used in this example) of the polygon mesh are further laid out as a triangle binary tree where the large triangles of the polygon mesh are divided into right and left halves, and these resultant triangles are further divided into smaller left and right halves, and so on until the desired degree of resolution is obtained. Because of the tree structure, any triangle can be traced up to the original large triangle. Again, binary trees other than triangle binary trees could be used and any such shape could be likewise traced up to the original large shape.

When a triangle binary tree is used to represent a square terrain patch or a polygon terrain mesh, sometimes three points are connected that are not necessarily close together. That is to say that a larger triangle of only three data points is used to represent more terrain data points enclosed by the triangle. This introduces certain errors in representation. The error bound array characterizes the levels of errors introduced when triangles of different sizes are used. When the smallest triangles are used, the errors will approach zero.

When the constant error bound is not set to zero, larger triangles may be used to represent terrain area as long as the representation errors are less than the selected error bound. Choosing a larger error bound has the effect of smoothing the displayed representation of the terrain such that only major features of the terrain are shown in areas away from the flight path. As the flight path is approached, the error bound is reduced (i.e., smaller triangles are selected to represent that portion of terrain) and more terrain detail is displayed.

Figure 5:
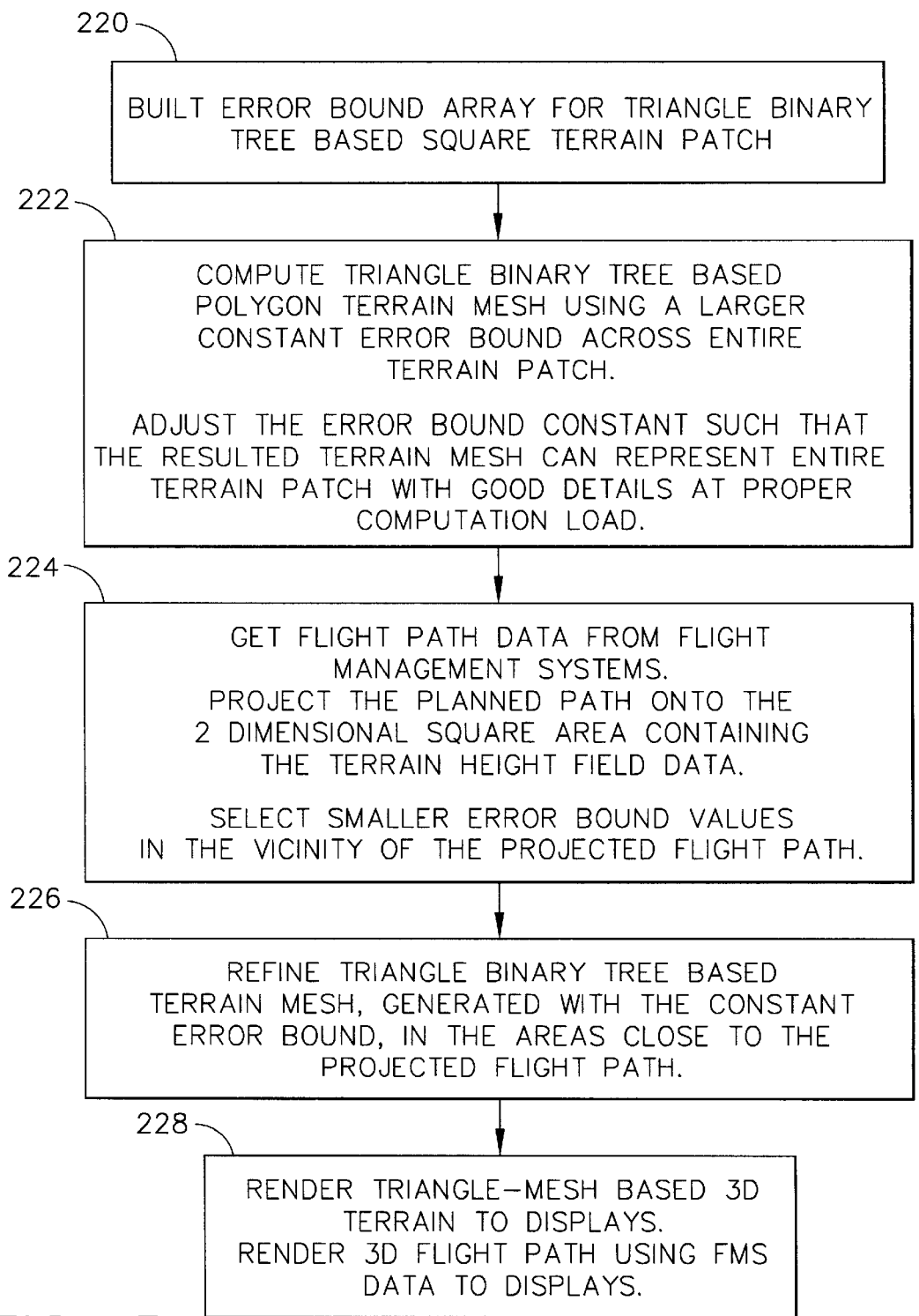
FIG. 5 is a flow diagram describing how the flight management system produces the display format of the invention.

FIG. 5 is a flow diagram describing how the flight management system, and particularly the graphics processor 102 of FIG. 1, produces the display format of the invention. In this example, triangle binary trees are again used, it being understood that other variants, as above, could be used.

Using the terrain data from the terrain database 106 of FIG. 1, an error bound array is constructed at 220 for a triangle binary tree based square terrain patch. The level of detail is determined by the application requirements.

A triangle binary tree based polygon terrain mesh is computed at 222 using a larger constant error bound across the entire terrain patch, and the error bound constant is adjusted such that the resultant terrain mesh can represent the entire terrain patch with good detail at a computation load which is appropriate for the system to provide display data in real time.

Flight path data is obtained at 224 from the flight management system, and, particularly from the navigation database 112 in FIG. 1. The planned flight path is projected onto the two dimensional square area containing the terrain height field data.

Also at 224 smaller error bound values in the vicinity of the projected flight path are selected in order to provide more terrain detail at or near the flight path.

The triangle binary tree based terrain mesh, generated with the constant error bound, is refined at 226 in the areas close to the projected flight path. The levels of further refinement for the terrain mesh are controlled by the selected error bound values in the area around the flight path to obtain more detailed view around intended flight path areas.

At 228 the 3D terrain generated by the triangle mesh, and the 3D flight path using Flight Management System data are provided to the display 104 of FIG. 1.

While the invention has been described in terms related to the preferred embodiment disclosed herein, it will become apparent to those skilled in the art that modifications may be made which however remain within the scope of the appended claims.

What is claimed is:

1. A flight deck display system comprising:

a display having a display screen for graphical display of data, a graphics processor for receiving terrain data from at least a terrain data base and flight plan information from a source of navigational data and for providing input data to the display screen, the terrain data being in the form of a variable error bound polygon binary tree based terrain patch, the display displaying a representation of the flight plan on the display screen and displaying a representation of the terrain underlying the flight plan, the representation of the terrain proximate to the representation of the flight plan being rendered with a smaller error bound than the representation of the terrain elsewhere on the display.

2. A flight management system as set forth in claim 1, wherein the display of the terrain outside the area proximate to the flight plan displays significant terrain features.

3. A flight management system as set forth in claim 1 wherein the display of the terrain representation outside the area proximate to the flight path utilizes a larger error bound to suppress minor terrain features.

4. A flight management system as set forth in claim 3, wherein the display of the terrain representation outside the area proximate to the representation of the flight plan displays significant terrain features.

5. In a flight management system having a graphics processor for providing display data to a display wherein a flight plan representation is underlaid by a terrain representation, a method for reducing the computation and data load on the graphics processor for producing the display, comprising:

construction an error bound terrain height defining an area of terrain to be displayed on the display using a selected error bound, such that the display renders useful terrain detail while allowing an acceptable processing load on the graphics processor, projecting the flight plan on the terrain representation, and selecting smaller error bound values for the terrain display in the area proximate to the representation of the flight plan.

6. A flight management system as set forth in claim 5 wherein the error bound array is a binary tree based array.

7. A flight management system as set forth in claim 6 wherein the binary tree is a triangle binary tree.

8. A flight management system as set forth in claim 5 wherein the error bound values are modifiable by a user of the flight management system.

9. A flight management system as set forth in claim 1 wherein the error bound is adjustable by a user of the system.

10. A flight management system as set forth in claim 1 wherein the polygon binary tree is a triangle binary tree.

11. A flight management system as set forth in claim 5 wherein the selected error bound contributes to the reduced computation and data load on the graphics processor.

12. A flight management system as set forth in claim 5 wherein a larger error bound is selected for areas not proximate to the flight plan.

\* \* \* \* \*